(No Model.)

O. G. NOSKER.
SPITTOON LIFTER.

No. 367,722. Patented Aug. 2, 1887.

WITNESSES.
Gustav Bohn
E. B. Griffith.

INVENTOR.
Orren G. Nosker.
By C. P. Jacobs
Atty.

UNITED STATES PATENT OFFICE.

ORREN G. NOSKER, OF SHELDON, ILLINOIS.

SPITTOON-LIFTER.

SPECIFICATION forming part of Letters Patent No. 367,722, dated August 2, 1887.

Application filed March 24, 1887. Serial No. 232,343. (No model.)

*To all whom it may concern:*

Be it known that I, ORREN G. NOSKER, of Sheldon, county of Iroquois, and State of Illinois, have invented certain new and useful Improvements in Spittoon-Lifters; and I do hereby declare that the following is a full, clear, and exact description thereof, reference being had to the accompanying drawings, in which like letters refer to like parts.
My invention relates to the construction of devices for lifting spittoons, pans, and other similar devices, and will be understood from the following description.

Figure 1:
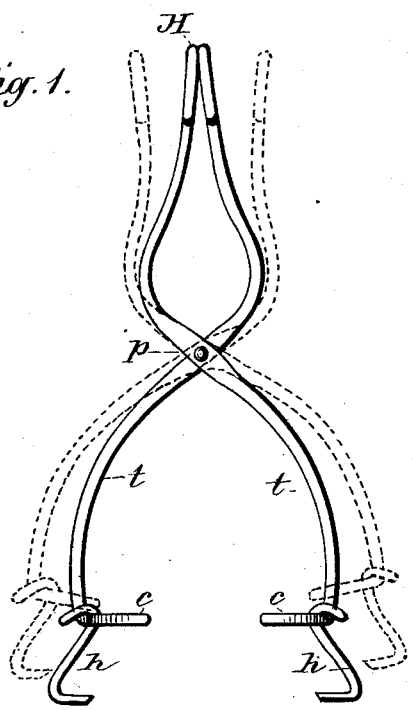
Figure 2:
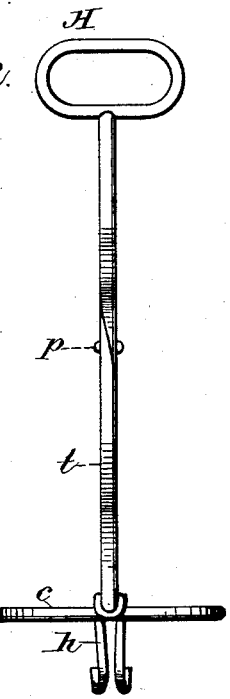
Figure 3:
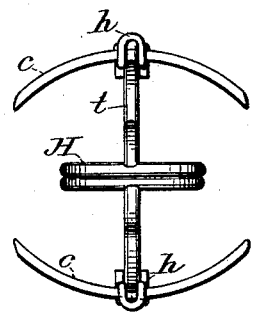

In the drawings, Figure 1 represents a side view, the full lines indicating the position of the lifter when the handles are closed, and the dotted lines giving the position of parts when open. Fig. 2 is an edgewise view, and Fig. 3 is a top view, of the same.
The lifter is formed of two parts, *t t*, united at *p* and having handles H at the top, and so far resembles the construction of ice-tongs; but to each of the tongs *t* are connected curved clamps *c*, which are intended to surround the object desired to be lifted or carried, so as to embrace the greater portion of its circumference and prevent it from falling out or oscillating while being carried about.

*h* are wire hooks formed in the fashion shown in Fig. 2, and are connected with the device, so that they may be used to compass a vessel of larger diameter than could be done by the tongs *t* in the absence of these hooks. They may be made with straight projections to pass under and grip the beaded edge of the spittoon, or may be made with wider prongs to take hold upon the pan or other vessel, if desired.

The device as constructed is especially useful about hotels and public halls where spittoons abound, and affords an easy and safe means for lifting and carrying spittoons, without danger of breaking or upsetting them or soiling the hands or clothing of the person.

I am aware that ice-tongs have been constructed consisting of two legs pivoted together and having sharp picks at the end to enter the ice, and do not claim such a device as my invention; but What I do claim as my invention, and desire to secure by Letters Patent, is the following:

1. The lifter herein described, composed of the tongs *t*, having handles H, pivoted together at *p* and provided with the clamp *c*, curved and encompassing the body of the spittoon, substantially as and for the purpose described.

2. The lifting-tongs herein described, composed of parts *t*, pivoted together at *p*, having handles H on one end and curved clamp *c* on the lower end, and the auxiliary hooks *h* connected therewith, substantially as shown and described.

In witness whereof I have hereunto set my hand this 21st day of March, 1887.

ORREN G. NOSKER.

Witnesses:
 SAMUEL B. POOL,
 L. M. BUTLER.